(12) United States Patent
Paert

(10) Patent No.: US 10,645,077 B2
(45) Date of Patent: May 5, 2020

(54) SYSTEM AND METHOD FOR SECURING OFFLINE USAGE OF A CERTIFICATE BY OTP SYSTEM

(71) Applicant: GEMALTO SA, Meudon (FR)

(72) Inventor: Jonas Paert, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 170 days.

(21) Appl. No.: 15/100,693

(22) PCT Filed: Dec. 1, 2014

(86) PCT No.: PCT/EP2014/076089
§ 371 (c)(1),
(2) Date: Jun. 1, 2016

(87) PCT Pub. No.: WO2015/082395
PCT Pub. Date: Jun. 11, 2015

(65) Prior Publication Data
US 2016/0330195 A1 Nov. 10, 2016

(30) Foreign Application Priority Data

Dec. 2, 2013 (EP) ..................................... 13306651

(51) Int. Cl.
*H04L 29/06* (2006.01)
*G06F 21/33* (2013.01)
(Continued)

(52) U.S. Cl.
CPC .......... *H04L 63/0838* (2013.01); *G06F 21/33* (2013.01); *G06F 21/34* (2013.01);
(Continued)

(58) Field of Classification Search
CPC . H04L 63/0838; H04L 63/06; H04L 63/0823; H04L 63/0846; H04L 9/006;
(Continued)

(56) References Cited

U.S. PATENT DOCUMENTS

| 4,720,860 A | * | 1/1988 | Weiss ...................... G06F 7/582 380/28 |
| 5,528,231 A | * | 6/1996 | Patarin ................. G06Q 20/341 340/5.27 |

(Continued)

FOREIGN PATENT DOCUMENTS

| EP | 1255392 A2 | 11/2002 |
| WO | WO0131840 A1 | 5/2001 |

OTHER PUBLICATIONS

PCT/EP2014/076089, International Search Report, dated Mar. 13, 2015, European Patent Office, P.B. 5818 Patentlaan 2, NL—2280 HV Rijswijk.

(Continued)

*Primary Examiner* — Catherine Thiaw
(74) *Attorney, Agent, or Firm* — The Jansson Firm; Pehr B. Jansson

(57) ABSTRACT

The present invention relates to a system and method for securing offline usage of a certificate by authenticating a user by a One Time Password (OTP) system when the user computing device is working in offline. An external authentication server of the server generates a set of expected OTP to protect the certificate. The server encrypts each certificate with a wrapper key and derivates a key from each OTP. Each derived key encrypts the wrapper key to create a set of encrypted wrapper keys. The computing device stores into its memory the encrypted certificate and the set of encrypted wrapper keys received from the authentication server. During a use of the certificate by the computing device working offline, an authentication request is received from a user of (Continued)

the computing device, the authentication request including a user-provided OTP. The computing device derives a key from the OTP provided. The OTP derived key being used to decrypt one corresponding wrapper key of the set of encrypted wrapper keys. The decrypted wrapper key being used to decrypt the certificate.

18 Claims, 2 Drawing Sheets

(51) Int. Cl.
*H04L 9/00* (2006.01)
*H04L 9/08* (2006.01)
*H04L 9/14* (2006.01)
*H04L 9/30* (2006.01)
*H04L 9/32* (2006.01)
*G06F 21/34* (2013.01)

(52) U.S. Cl.
CPC ............ *H04L 9/006* (2013.01); *H04L 9/0861* (2013.01); *H04L 9/14* (2013.01); *H04L 9/302* (2013.01); *H04L 9/3263* (2013.01); *H04L 63/06* (2013.01); *H04L 63/0823* (2013.01); *H04L 63/0846* (2013.01); *G06F 2221/2107* (2013.01)

(58) Field of Classification Search
CPC ..... H04L 9/302; H04L 9/3263; H04L 9/0861; H04L 9/14; G06F 21/33; G06F 21/34; G06F 2221/2107
See application file for complete search history.

(56) References Cited

U.S. PATENT DOCUMENTS

| | | | |
|---|---|---|---|
| 8,949,201 B1* | 2/2015 | Batchu | G06F 17/30303 |
| | | | 707/692 |
| 2005/0166263 A1 | 7/2005 | Nanopoulos et al. | |
| 2010/0023757 A1* | 1/2010 | Nguyen-Huu | H04L 9/083 |
| | | | 713/156 |
| 2010/0199099 A1* | 8/2010 | Wu | H04L 9/0894 |
| | | | 713/182 |
| 2011/0219227 A1* | 9/2011 | Sharif | G06F 21/33 |
| | | | 713/158 |
| 2013/0339746 A1* | 12/2013 | Ignatchenko | H04L 9/3226 |
| | | | 713/183 |

OTHER PUBLICATIONS

PCT/EP2014/076089, Written Opinion of the International Searching Authority, dated Mar. 13, 2015, European Patent Office, P.B. 5818 Patentlaan 2, NL—2280 HV Rijswijk.

* cited by examiner

SYSTEM AND METHOD FOR SECURING OFFLINE USAGE OF A CERTIFICATE BY OTP SYSTEM

TECHNICAL FIELD

The present invention generally relates to managing a computing system, and more specifically, to authentication and/or access for/to a computing system.

Particularly, the present invention relates to a system and method for securing offline usage of a certificate by authenticating a user by a One Time Password (OTP) system when the user computing device is working in offline.

BACKGROUND ART

Computing systems such as desktop computers, laptop computers, tablets, netbooks, and servers, are now commonly used by various people and organizations. As the prevalence of computing systems grows, authentication of users and system security on the computing systems continues to be an important concern. Many computing systems use a user password to allow a user access to the computing system (e.g., log into the computing system).

If a non-authorized person obtains a user's password, then the non-authorized person may be able to obtain the privileges and the level of access the user had to the computing system. After gaining the privileges/access of the user, a non-authorized person may attempt to change the settings on the computing system, access network resources, and/or attempt to access sensitive data (e.g., access to the user's files on a local hard drive) on the computing system. For example, the non-authorized person may change network settings on the computing system to redirect network traffic to a different server. In another example, the non-authorized person may attempt to install malicious programs such as spyware, malware, viruses, trojans, keyloggers, and/or worms on the user's computing system. In a further example, the non-authorized person may be able connect to the network resources after gaining the privileges/access of the user. The non-authorized person might gain access to the network resources such as shared files, documents, emails, network drives, websites, and/or network services, by impersonating the user (e.g., by using a user's username and/or password).

In order to enhance the security of computing systems, some computing systems use multi-factor authentication. A multi-factor authentication may use three authentication factors: 1) something the user knows (e.g., the user's password); 2) something the user has (e.g., a security token or smart card); and 3) something the user is (e.g., a biometric factor such as a fingerprint, retinal scan, etc.). One common form of multi-factor authentication is two-factor authentication in which the first factor is the user password and the second factor is a one-time password (OTP) generated by a generator OTP in possession of the user.

To provide short lived certificates to computing device for logon, with a high level security, the user is requested to be authenticated by an authentication server by OTP. When the OTP entered by the user into the computing system is authenticated by the server, the authentication server enrolls the user for a short-lived certificate from a certification authority.

After the certificate is returned to the user, the certificate is saved in the personal certificate store on the user's computer and interacts with the logon components as if it is a smart card logon to the computer.

Two problems with this solution are that subsequent usages of the issued certificate cannot be restricted and that the user has to be online for it to work, forbidding logon to the local machine when no network is available (e.g. in a plane).

Therefore, if the computing system is unable to communicate with the authentication server, the computing system is unable to authenticate the OTP and the user may be denied access to the computing device because the short-lived certificate cannot be generated.

Another traditional approach is to store the RSA key on a server and provide remote usage of the key after proper authentication (possibly OTP) of the user. In this scenario any offline usage of the RSA key is impossible as the key remains on the server at all time.

There is a need to authenticate the user by OTP system and to provide the RSA key to the user even if the computing device is unable to communicate with the authentication server.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present invention addresses the aforementioned security drawbacks to authenticate the user by OTP system even if the computing system is unable to communicate with the authentication server. The present invention relates to a system and method for authenticating the user when the user device works in offline.

To allow authenticating the user by OTP when the system is in offline, the present invention enables a registration process. During this registration process of the user to an authentication server, the user can be authenticated by password+One Time Password (OTP) generated by a user OTP generator.

When the authentication is successful, an account of the user is created and a set of future OTP values in quantity N is generated. The registration process then allows leveraging the user capability to protect issuance and usage of a RSA key with the created OTP. Then, the set of future OTP values will be used to protect the RSA key. For that, for each OTP, the authentication server derives a key. This key can be derived using the OTP value and the user's password.

The authentication server generates a RSA key and encrypts it with a symmetric wrapper key. Each derived key is used to encrypt the wrapper key. The authentication server then compiles a list of the wrapper key encrypted under different OTP values in a form of a stack.

The encrypted RSA key and the set of encrypted wrapper keys are transmit o the user device and stored into its database. The same set of compile list of encrypted wrapper keys is stored in the server database, and used by server for next N times authentication sequentially. The generated encrypted wrapper key is used strictly once for a transaction.

With predefined sequence of OTP values, the user is authenticated even if the user device works in offline.

During a use of the RSA key by the user, the user OTP generator generates an OTP value. With the user password and the OTP generated, the user device derives an OTP key from the OTP using the same algorithm that was used on the server. The OTP derived key can then be used to decrypt the wrapper key which in turn will allow decryption and usage of the RSA key. When the operation completes, the client erases the used encrypted wrapper key to prevent replay attacks and key loggers.

The user is then free to use the RSA key for example for logon even if the user device is working in offline. One OTP gives the user one wrapper key to decrypt the RSA key. And the next time the user needs to use the RSA key another OTP has to be provided.

On the next online interaction, a new RSA key and wrapper key list will be generated to either replace the first one or to be available once the first expires.

The user's password is an important input as it maintains two-factor authentication and increases the entropy of the input to the key derivation mechanism.

Protecting the keys of these certificates with OTP values affords advantages such as allowing the user to log on when their computer is offline and restricting the usage of the logon certificate so that a attacker with access to just the computer cannot utilize it.

To this end, there is provided a method for securing an offline usage of a certificate by a computing device with an One Time Password (OTP) system, wherein operating an external authentication server to generate a set of expected OTP to protect the certificate, the server encrypts each certificate with a wrapper key, and derivates a key from each OTP, each derived key encrypts the wrapper key to create a set of encrypted wrapper keys, operating the computing device to store into its memory the encrypted certificate and the set of encrypted wrapper keys received from the authentication server, during a use of the certificate by the computing device working offline, receiving an authentication request from a user of the computing device, the authentication request including a user-provided OTP; and operating the computing device to derive a key from the OTP provided, the OTP derived key being used to decrypt one corresponding wrapper key of the set of encrypted wrapper keys, the decrypted wrapper key being used to decrypt the certificate.

According to non-limitative embodiments of the invention, the method in accordance with the invention further comprises the following characteristics.

In a first non-limitative embodiment, the list of encrypted wrapper keys is compiled sequentially in the same order that the generated OTPs.

In a non-limitative embodiment, the corresponding encrypted wrapper key to be picked from the set is the first encrypted wrapper key on the stack of the compiled encrypted wrapper keys.

In a non-limitative embodiment, the corresponding encrypted wrapper key to be picked is the encrypted wrapper key based on the current time.

In a non-limitative embodiment, when the certificate is decrypted, operating the computing device to erase the used encrypted wrapper key from its memory to prevent replay attacks and key loggers.

In a non-limitative embodiment, when the session using the certificate is ended, the computing device wipes the decrypted certificate and the decrypted wrapper key from its memory.

In a non-limitative embodiment, the OTP derived key is derived from the OTP and the user's credentials.

In a non-limitative embodiment, the set of encrypted wrapper keys is acquired from the authentication server includes during an authentication session in which the user successfully authenticates with the authentication server.

In a non-limitative embodiment, a new set of encrypted wrapper keys is generated automatically by the server during a first registration of the user, in response to a user request, a time based device or a command from the computing device.

In a non-limitative embodiment, the new set of encrypted wrapper keys is sent to the computing device by the server with a new encrypted certificate.

In a non-limitative embodiment, a lifetime is associated to the certificate, a command for a new set of encrypted wrapper keys and the certificate is sent from the computing device to the server, when the lifetime is ended.

In a non-limitative embodiment, the certificate is generated by the server or a certificate authority on request by the server.

In a non-limitative embodiment, the wrapper key is generated by the server or by a third party.

In a non-limitative embodiment, wherein the set of encrypted wrapper keys and the encrypted certificate are stored in a secure space of the computing device.

In addition, there is provided a system for securing an offline usage of a certificate by a computing device with an One Time Password (OTP) system, according to any previous claims, wherein said system comprising an external authentication server operating to generate a set of expected OTP to protect the certificate, said server encrypts each certificate with a wrapper key, and derivates a key from each OTP, each derived key encrypts the wrapper key to create a set of encrypted wrapper keys, said computing device operating to store into its memory the encrypted certificate and the set of encrypted wrapper keys received from the authentication server, during a use of the certificate by the computing device working offline, receiving an authentication request from a user of the computing device, the authentication request including a user-provided OTP; and the computing device operating to derive a key from the OTP provided, the OTP derived key being used to decrypt one corresponding wrapper key of the set of encrypted wrapper keys, the decrypted wrapper key being used to decrypt the certificate.

BRIEF DESCRIPTION OF THE DRAWINGS

The following detailed description will be better understood with the drawings, in which.

DETAILED DESCRIPTION OF THE EMBODIMENTS OF THE INVENTION

Figure 1:
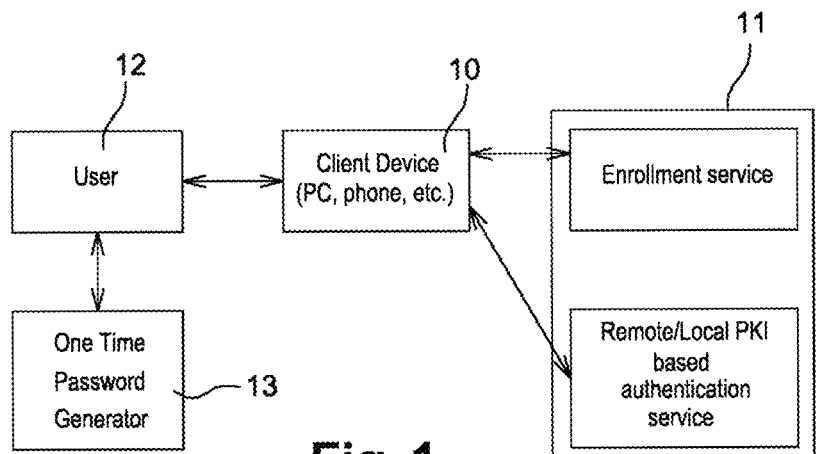
FIG. 1 illustrates the different entities involved in a process to authenticate a user by one time passwords system even if the user device is in offline.

The present invention is not specific to any particular hardware or software implementation, and is at a conceptual level above specifics of implementation. It is to be understood that various other embodiments and variations of the invention may be produced without departing from the spirit or scope of the invention. The following is provided to assist in understanding the practical implementation of particular embodiments of the invention.

The same elements have been designated with the same referenced numerals in the different drawings. For clarity, only those elements and steps which are useful to the understanding of the present invention have been shown in the drawings and will be described.

Further, the mechanisms of data communication between the parties and their environment have not been detailed either, the present invention being here again compatible with usual mechanisms.

Furthermore, the connecting lines shown in the various figures contained herein are intended to represent exemplary functional relationships and/or physical couplings between the various elements. It should be noted that many alternatives or additional functional relationships or physical connections may be present in a practical system. Furthermore, the various entities in FIG. 1 may communicate via any suitable communication medium (including the Internet), using any suitable communication protocol.

Moreover, when an action is said to be performed by a device, it is in fact executed by a microprocessor in this device controlled by instruction codes recorded in a program memory on said device. An action is also ascribed to an application or software. This means that part of the instruction codes making up the application or software are executed by the microprocessor.

Reference throughout the specification to "an embodiment" or "another embodiment" means that a particular feature, structure, or characteristic described in connection with an embodiment is included in at least one embodiment of the subject matter disclosed. Thus, the appearance of the phrases "in an embodiment" or "in another embodiment" in various places throughout the specification is not necessarily referring to the same embodiment. Further, the particular features, structures or characteristics may be combined in any suitable manner in one or more embodiments.

FIG. 1 shows entities involved in a flow diagram for managing one time password (OTP) system on offline work of a user device 10. For simplicity of discussion, only one of each entity is shown at FIG. 1. It is understood, however, that embodiments of the technology may include more than one of each entity. Additionally, some embodiments of the technology may include fewer than all of the entities shown in FIG. 1. FIG. 1 depicts an example of the system in which a server processing environment 12 is implemented.

Embodiments of the present invention will be exemplified using a communication device such as a computing device. Examples of such devices may for instance be any type of computing device, laptops (such as standard, ultra portables, netbooks, micro laptops, and pads), handheld computers, PDAs, gaming devices, mobile phones, etc. However, for the sake of clarity and simplicity, the embodiments outlined in this specification are exemplified with and related to a computing device only.

The computing device 10 typically comprises a processor, a memory, input devices, output devices, and suitable communications scheme, all of which are operatively coupled to the processor. The computing device 10 comprises a display area and a user interface such as a keyboard for navigating among items displayed in the display area and entering text and numbers into the computing device 10.

The computing device 10 interacts with the authentication server 11 through a network such as Internet.

As used herein, a "server" is a computing device that may be configured to interact in an automated fashion with other devices over a network to serve content and web pages, to issue responses to communications from other network devices and to respond to queries from other network devices.

The OTP is generally a password which is valid for one login session or transaction. The OTP may be generated by a security token 13 (e.g., an USB token, a physical token, a software token, etc.). In an embodiment, the generated OTP may be entered by the user manually into the computing device (e.g., via a keyboard). In another embodiment, the security token 13 is coupled to the computing device 10. In this case, the security token 13 may provide the OTP to the computing device 10. The OTP provides an extra layer of security in addition to the user password. Some two-factor authentication systems may use a Personal Identification Number (PIN) which the user may provide to the security token, before the security token generates an OTP.

Figure 2:
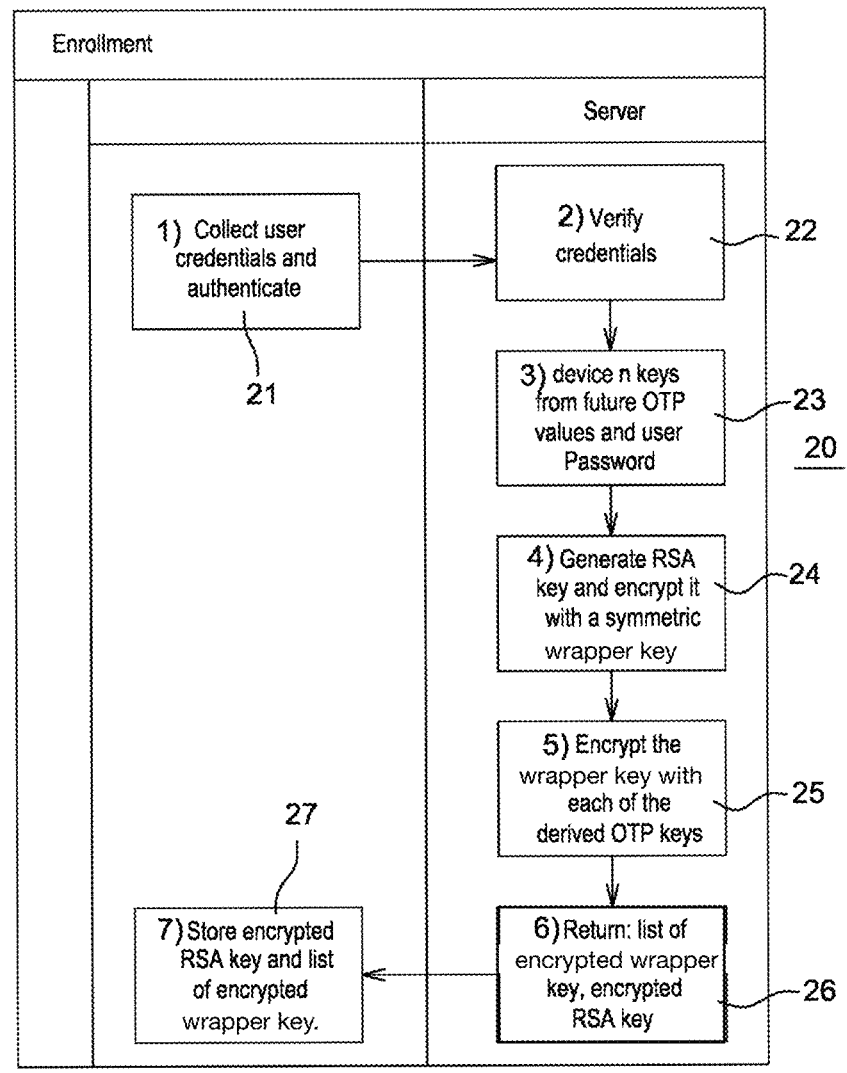
FIG. 2 is a logic flow diagram in accordance with an exemplary embodiment of this invention during an enrollment phase of the user.

FIG. 2 illustrates an exemplary flow diagram during an enrollment phase of the user 12. Therein, the process flow between the computing device 10 and the server 11 is depicted with labeled arrows to which respective numbers are assigned. The flow is understood as being performed sequentially from top to bottom as indicated by the increasing numbers. However, it should be noted that there may be multiple instances of this protocol run in parallel without specified ordering.

FIG. 2 is a flow chart depicting a set of functions 20 that can be carried out in accordance with an example embodiment. The set of functions 20 can be performed to enroll the computing device on the server 11. The set of functions 20 are shown within steps 21 through 27. A description of these steps now follows.

At step 21, the computing device 10 displays a registration icon (not shown) on its display area in which the user can activate in order to initiate the enrollment process. The registration icon can comprise the text "REGISTER" or some other text or symbol.

In an embodiment, step 21 can be invisible to the user. This step is activated automatically by the computing device when for example the user is registered for the first time.

When the enrollment process is activated, the computing device 10 displays a free-form entry field on the display area in which the user is prompted to enter the user's identifier and the user password. The user is also prompted to enter a One Time Password (OTP) generated by the security token 13.

The computing device 10 transmits, through the network, the user credentials comprising user's unique identifier, the password and the generated OTP to the server 11. The server 11, at step 22, performs a lookup to check whether a user account associated with the user's unique identifier already exists in its database. If no such user account exists, the server 11 can create a user account in its database.

When the user account exists into the server database, the server 11 verifies the received OTP. If the OTP verification is successful, the server 11 generates, at step 23, a set of OTP values in quantity N sequentially.

In an embodiment, the OTP can be generated according an event based device. In this case, the counter is increased by one every time the user requests an OTP to be generated (by a button press or similar). This gives us a new OTP every button press.

In another embodiment, the OTP is generated according a time based device. In this implementation, OTP is generated based on the time at every time. In an example, a new OTP is generated every 30 seconds.

From each OTP value, the server 11 derives an OTP key. The OTP key is derived using a derivation algorithm with the password of the user credentials and the OTP value as input. The derivation algorithm used herein is well known by the person in the art and do not need to be described any more.

At step 24, a certificate or a RSA key is generated. This certificate can be generated by a certificate authority on request by the server. In another embodiment, the certificate can be generated by the server itself.

This RSA key is encrypted with a wrapper key. The wrapper key can be generated by the server itself or by a third party. At step 25, the wrapper key is encrypted with each of the OTP key. The list of encrypted wrapper key can be compiled sequentially in the same order that the OTP value is generated.

At step 26, the server elaborates a message comprising the compiled encrypted wrapper keys and the encrypted RSA key. The server transmits, through the network, the message to the computing device for storage, at step 27. The compiled encrypted wrapper keys and the encrypted RSA key are preferably stored in a secure space of the computing device which is not accessible from the external.

Figure 3:
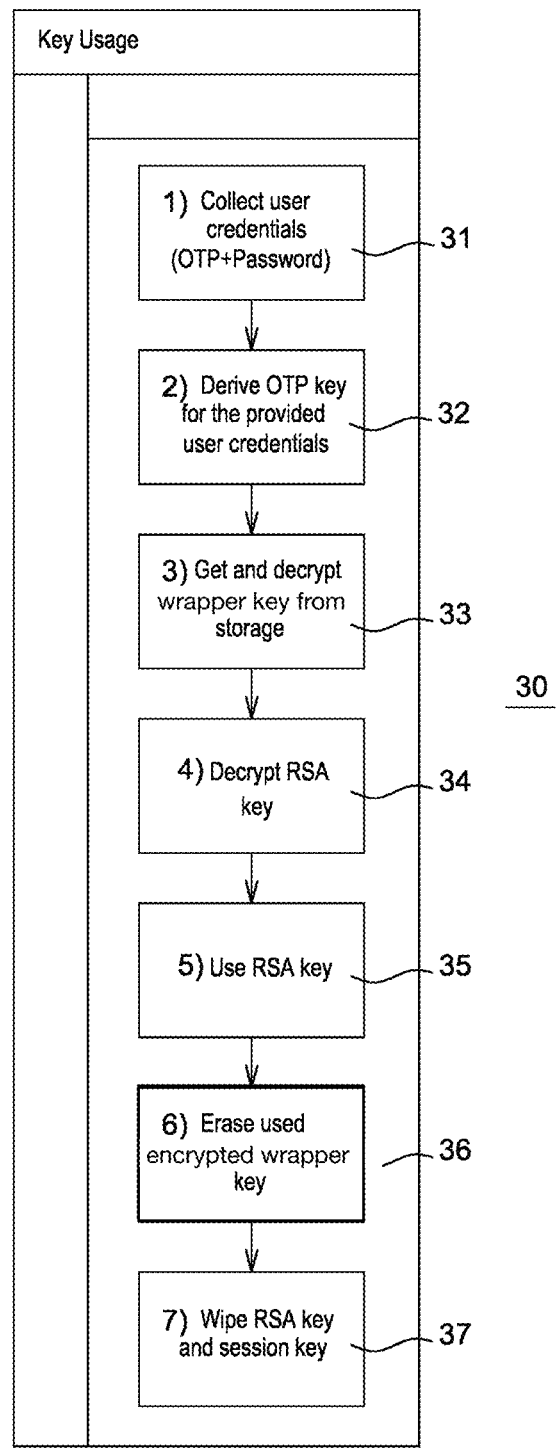
FIG. 3 is an offline working flow diagram of the user device in accordance with an exemplary embodiment of this invention.

FIG. 3 illustrates an exemplary of offline working flow diagram 30 in an embodiment. When the user wants to use the RSA key, the offline working flow 30 is activated due, for example, to a click on a corresponding icon displayed on the computing device.

At step 31, the user is prompted to enter the user's password and the OTP generated by the security token 13. At step 32, the computing device derives an OTP key. The OTP key is derived from the derivation algorithm, the password and the OTP entered. At step 33, the computing device picks a corresponding encrypted wrapper key to the compiled encrypted wrapper keys.

The corresponding encrypted wrapper key to be picked depends on the embodiment previously chosen during the generation of the OTP values. Indeed, if an event based device is used to generate OTP values, the computing devices picks the first encrypted wrapper key on the stack of the compiled encrypted wrapper keys. The computing device is able to verify OTPs until the stored compiled list of encrypted wrapper key is empty.

If a time based device is used to generate OTP values, the compiled encrypted wrapper keys comprises encrypted wrapper keys per time step. The computing device is able to verify the OTPs until the time has passed outside of the time window predefined. The computing device picks the encrypted wrapper key based on the current time. For example, the compiled encrypted wrapper keys comprises 2880 encrypted wrapper keys. One encrypted wrapper key is valid for 30 seconds, then the compiled list is valid for an authentication for a day.

The computing device decrypts the picked wrapper key with the derived OTP key.

At step 34, the computing device derives the RSA key with the decrypted wrapper key. The user can then open a session to use the RSA key at step 35. At step 36, the used encrypted wrapper key is erased from the compiled list of the encrypted wrapper keys. At step 37, when the session using the RSA key is ended, the computing device wipes the decrypted RSA key and the decrypted wrapper key from its database.

In an embodiment, when the offline working flow is activated, the computing device verifies whether unused encrypted wrapper keys which were generated by the server are remaining. If there is no unused encrypted wrapper key remaining in the computing device, then a command is sent to the server to generate another set of encrypted wrapper keys, when the computing device is connected to the server. Steps 21 to 27 of FIG. 2 are performed again, when the server 11 receives such command of generation. The computing device delete from its database the message previously received from the server and replace it with the new message received. This new message comprises a new encrypted RSA key and a new compiled list of encrypted wrapper keys.

In another embodiment, when the server receives a command to generate another set of encrypted wrapper keys, step 24 is not performed. The RSA key is not generated again.

In another embodiment, the RSA key comprises a lifetime. When the lifetime is reach, and when the computing device is connected to the server, the command to generate another set of encrypted wrapper keys and the RSA key is sent to the server. Steps 21 to 27 of FIG. 2 are performed.

The invention is simple and easy to implement, and does not require additional hardware at the computing device.

The invention claimed is:

1. A method for securing an offline user authentication using a lifetime-limited certificate by a computing device with a One Time Password (OTP) system, comprising:

generating a lifetime-limited certificate;

operating an external authentication server to generate a set of expected OTP to protect the lifetime-limited certificate, the external authentication server encrypts the lifetime-limited certificate with a wrapper key, and derives a key from each OTP of said set of expected OTP, each said derived key encrypts the wrapper key to create a set of encrypted wrapper keys, transmitting from the external authentication server a message with the encrypted lifetime-limited certificate and the set of encrypted wrapper keys to the computing device;

operating the computing device to store into its memory the encrypted lifetime-limited certificate and the set of encrypted wrapper keys received from the external authentication server, during a use of the lifetime-limited certificate by the computing device working offline, receiving an authentication request from a user of the computing device, the authentication request including a user-provided OTP; and operating the computing device to derive a key from the user-provided OTP, the derived key being used to decrypt one corresponding wrapper key of the set of encrypted wrapper keys, the decrypted wrapper key being used to decrypt the lifetime-limited certificate;

opening a session using the decrypted lifetime-limited certificate;

when the session using the lifetime-limited certificate is ended, the computing device wipes the decrypted lifetime-limited certificate and the decrypted wrapper key from its memory; and when the lifetime of the lifetime-limited certificate has ended, transmitting from the computing device to the external authentication server a command to generate a new lifetime-limited certificate and new values for the set of encrypted wrapper keys, and repeating the steps of operating an external authentication server to generate new values for the set of expected OTP to protect the lifetime-limited certificate, wherein the external authentication server encrypts the lifetime-limited certificate with the wrapper key and derives a key with a new value from each OTP of said new values for the set of expected OTP, each said derived key with the new value encrypts the wrapper key to create the new values for the set of encrypted wrapper keys.

2. The method of claim 1, wherein the list set of encrypted wrapper keys is compiled sequentially in the same order that the generated set of expected OTP.

3. The method of claim 1, wherein the corresponding encrypted wrapper key to be picked from the set of encrypted wrapper keys is the first encrypted wrapper key on a stack of compiled encrypted wrapper keys.

4. The method according to claim 1, wherein the corresponding encrypted wrapper key to be picked is an encrypted wrapper key based on the current time.

5. The method of claim 1, wherein when the lifetime-limited certificate is decrypted, operating the computing device to erase the decrypted wrapper key from its memory to prevent replay attacks and key loggers.

6. The method of claim 1, wherein the OTP derived key is derived from the OTP and the user's credentials.

7. The method of claim 1, wherein the set of encrypted wrapper keys is acquired from the external authentication server during an authentication session in which the user successfully authenticates with the external authentication server.

8. The method of claim 1, wherein the set of encrypted wrapper keys is generated automatically by the external authentication server during a first registration of the user, in response to a user request, a time based device or a command from the computing device.

9. The method according to claim 8, wherein the set of encrypted wrapper keys is sent to the computing device by the external authentication server with the encrypted lifetime-limited certificate.

10. The method of claim 1, wherein a lifetime is associated to the lifetime-limited certificate, a command for a new set of encrypted wrapper keys and lifetime-limited certificate is sent from the computing device to the external authentication server, when the lifetime is ended.

11. The method of claim 1, wherein the lifetime-limited certificate is generated by the external authentication server or a certificate authority on request by the external authentication server.

12. The method of claim 1, wherein the wrapper key is generated by the external authentication server or by a third party.

13. The method of claim 1, wherein the set of encrypted wrapper keys and the encrypted lifetime-limited certificate are stored in a secure space of the computing device.

14. A system for securing an offline usage of a lifetime-limited certificate by a computing device with a One Time Password (OTP) system, comprising:

an external authentication server operating to generate a lifetime-limited certificate, a set of expected OTP to protect the certificate, said external authentication server encrypts the lifetime-limited certificate with a wrapper key, and derives a key from each OTP of said set of expected OTP, each derived key encrypts the wrapper key to create a set of encrypted wrapper keys, said computing device operating to store into its memory the encrypted lifetime-limited certificate and the set of encrypted wrapper keys received from the external authentication server, during a use of the lifetime-limited certificate by the computing device working offline, receiving an authentication request from a user of the computing device, the authentication request including a user-provided OTP; and the computing device operating to derive a key from the user-provided OTP, the derived key being used to decrypt one corresponding wrapper key of the set of encrypted wrapper keys, the decrypted wrapper key being used to decrypt the lifetime-limited certificate;

the computing device operates to open a session using the decrypted lifetime-limited certificate;

when the session using the lifetime-limited certificate is ended, the computing device operates to wipe the decrypted lifetime-limited certificate and the decrypted wrapper key from its memory; and when the lifetime of the lifetime-limited certificate has ended, the computing device operates to transmit to the external authentication server a command to generate a new lifetime-limited certificate and new values for the set of encrypted wrapper keys, and repeating the steps of operating an external authentication server to generate new values for the set of expected OTP to protect the lifetime-limited certificate, wherein the external authentication server encrypts the lifetime-limited certificate with the wrapper key, and derives a key with a new value from each OTP of said new values for the set of expected OTP, each said derived key with the new value encrypts the wrapper key to create the new values for the set of encrypted wrapper keys.

15. The system of claim 14, wherein the list set of encrypted wrapper keys is compiled sequentially in the same order that the generated set of expected OTP.

16. The system of claim 14, wherein the corresponding encrypted wrapper key to be picked from the set of encrypted wrapper keys is the first encrypted wrapper key on a stack of the compiled encrypted wrapper keys.

17. The system of claim 14, wherein the corresponding encrypted wrapper key to be picked is an encrypted wrapper key based on the current time.

18. The system of claim 14, wherein when the lifetime-limited certificate is decrypted, operating the computing device to erase the decrypted wrapper key from its memory to prevent replay attacks and key loggers.

* * * * *